Patented Apr. 21, 1953

2,635,978

UNITED STATES PATENT OFFICE 2,635,978

SALTS OF N-NITROSO PHENYLHYDROXYL AMINES AS FUNGICIDES AND BACTERICIDES

John T. Massengale, Wyandotte, Mich., assignor to Sharples Chemicals Inc., a corporation of Delaware No Drawing. Application July 21, 1949, Serial No. 106,098

15 Claims. (Cl. 167—30)

The present invention relates to improved methods and compositions for treating seeds, plants, and fruits to protect them from attack by microorganisms, such as bacteria and fungi. More particularly it relates to processes and compositions for treating seeds, plants, and fruits with compositions containing as the essential active ingredient certain salts of N-nitroso-N-phenylhydroxylamine and its derivatives as herewithin described.

My processes and compositions are of unusual value in that by use of them protection may be obtained against a number of plant diseases that are least well controlled by presently used materials and processes.

Illustrative of the above-stated efficacy of my processes is the protection from blights and anthracnose that can be obtained by treating tomato plants with my compositions. At present there are a number of claimed methods for accomplishing this desired effect, but insofar as I am aware, all are known to be relatively ineffective. The most generally recommended procedure has been to spray the plants alternately with an inorganic copper-containing fungicide and one of the presently available dithiocarbamate fungicides at intervals of seven to fourteen days. I have found that my compositions when used alone give excellent protection if applied at ten to fourteen day intervals in extremely small dosages.

The use of protectants to treat seeds in order to kill adhering fungi and bacteria and to prevent soil-borne microorganisms from reducing the percentage emergence of healthy plants is well known. I have found that both as a matter of dosage and of economic benefit my compositions are extremely useful for this purpose. My compositions, and particularly those which are water-soluble, are employed advantageously to treat seed-bed soil either before and/or after seeding to increase emergence and to prevent pre-emergence and post-emergence "damping-off" of the resulting plants.

An advantage of my invention is that phytotoxic effects on treated plants are either unnoticeable or very slight. My materials can be handled and used without harm to equipment or operators. Furthermore, their use has no deleterious effects on the edibility or other utility of the plant.

The active ingredients of my compositions have been known to chemists for a long time, but I am the first to note that these ingredients may be properly formulated and applied to growing plants or to the fruits or seeds of plants with beneficial results.

The art of controlling plant disease by applying chemical protectants to plants is well known. Inorganic chemicals or compositions such as sulfur, copper sulfate-lime, and copper sulfide have been employed. Salts of substituted dithiocarbamates, chloranil, 2,3-dichloro-1,4-naphthoquinone, tetramethylthiuram disulfide, and certain organomercurials are familiar organic materials used as protectants. The number of chemical compounds which by one test or another can be shown to possess a high degree of fungicidal or bactericidal efficiency is quite large. The number of microbiologically active compounds that by suitable compositions, formulations, or methods can be advantageously used for treating plants represents a very small percentage of this group. My invention has not only added a new class of chemical substances to this latter limited group, but it has also contributed an unusually effective class in relation to these previously preferred materials.

For convenience in description, unless otherwise modified, the term plant will be used herein and in the claims to mean those botanical species which belong to the general classifications of bryophytes, pteridophytes, or spermatophytes, and especially those which possess economic importance. The term plant is also understood to include all portions of the plant, such as the roots, stems, leaves, blossoms, seeds, and fruits. For purposes of emphasis certain portions of the plant, especially the seed and the fruit, are mentioned specifically, but this is not meant to limit the term plant so as to exclude any portion thereof.

In the practice of my invention I apply to a plant or portion thereof a composition which has as an essential ingredient a salt of an N-nitroso-N-arylhydroxylamine or a salt of an appropriately substituted N-nitroso-N-arylhydroxylamine. This active ingredient may be represented by the formula

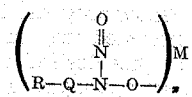

where M is a metal cation or complex cation such as that of sodium, potassium, calcium, barium, magnesium, zinc, copper, aluminum, iron, mercury, alkylammonium such as monoalkylammonium, dialkylammonium, trialkylammonium, or tetraalkylammonium, said alkylammonium radical having from 1 to 3 carbon atoms in each alkyl group, alkanolammonium such as monoalkanolammonium, dialkanolammonium, or trialkanolammonium, said alkanolammonium radical having from 2 to 3 carbon atoms in each alkanol group, or mixed alkylalkanolammonium such as monoalkyl monoalkanolammonium, dialkyl monoalkanolammonium, and monoalkyl dialkanolammonium in which each alkyl group contains from 1 to 3 carbon atoms and each alkanolammonium group contains from 2 to 3 carbon atoms; where $x$ is a number corresponding to the valence of the cation M; where Q is the phenyl radical; and where R represents from 0 to 1 substituents on the aromatic ring selected from the group consisting of halogen, alkyl, alkoxy, aryloxy, or aryl. Examples of R are fluorine, chlorine, bromine, methyl, ethyl, propyl, butyl, methoxy, ethoxy, propoxy, butoxy, phenoxy, and phenyl.

Specific illustrative examples of the above compounds are: methylammonium N-nitroso-N-phenylhydroxylamine; ethylammonium N-nitroso-N-phenylhydroxylamine; dimethylammonium N-nitroso-N-phenylhydroxylamine; trimethylammonium N-nitroso-N-phenylhydroxylamine; tetramethylammonium N-nitroso-N-phenylhydroxylamine; monoethanolammonium N-nitroso-N-phenylhydroxylamine; diethanolammonium N-nitroso-N-phenylhydroxylamine; triethanolammonium N-nitroso-N-phenylhydroxylamine; ethylethanolammonium N-nitroso-N-phenylhydroxylamine; diethylethanolammonium N-nitroso-N-phenylhydroxylamine; sodium N-nitroso-N-phenylhydroxylamine; potassium N-nitroso-N-phenylhydroxylamine; calcium N-nitroso-N-phenylhydroxylamine; cupric N-nitroso-N-phenylhydroxylamine; cupric N-nitroso-N-4-fluorophenylhydroxylamine; ferrous N-nitroso-N-phenylhydroxylamine; ferric N-nitroso-N-phenyl-hydroxylamine; aluminum N-nitroso-N-phenylhydroxylamine; mercuric N-nitroso-N-phenylhydroxylamine; zinc N-nitroso-N-phenylhydroxylamine; calcium N-nitroso-N-phenylhydroxylamine; cupric N-nitroso-N-2-chlorophenylhydroxylamine; ferric N-nitroso-N-3-chlorophenylhydroxylamine; cupric N-nitroso-N-4-chlorophenylhydroxylamine; cupric N-nitroso-N-otolylhydroxylamine; cupric N-nitroso-N-m-tolylhydroxylamine; cupric N-nitroso-N-p-tolylhydroxylamine; cupric N-nitroso-N-p-tertbutylphenylhydroxylamine; cupric N-nitroso-N-p-biphenylhydroxylamine; cupric N-nitroso-N-2-ethoxyphenylhydroxylamine; cupric N-nitroso-N-4-ethoxyphenylhydroxylamine; cupric N-nitroso-N-2-bromophenylhydroxylamine; cupric N-nitroso-N-4-phenoxyphenylhydroxylamine; barium N-nitroso-N-phenylhydroxylamine.

Synthesis of the compounds useful in the practice of my invention can be readily accomplished by methods known in the chemical art. Many examples can be found in the literature. A convenient method of preparation, for example, consists in reducing a suitable aromatic nitro compound to the corresponding arylhydroxylamine, nitrosating this intermediate, and isolating the product directly as the desired salt or forming such salt later by an appropriate means such as by metathesis. The reduction may be accomplished by any one of a number of reagents, such as zinc and ammonium chloride, or sodium hydrosulfide in a calcium chloride solution, or hydrogen sulfide and ammonia. The nitrosation of the aromatic hydroxylamine may be accomplished by means of an alkyl nitrite in an ammoniacal solution, or by means of an inorganic nitrite in acid solution, or by means of acidifying a solution of an inorganic nitrite in an aqueous methanol or ethanol solution.

For example, procedures for preparing the corresponding ammonium salts from which the compounds useful in the practice of my invention may be readily prepared by metathesis are set forth on pages 435–437 inclusive and pages 171–173 inclusive, "Organic Syntheses," collective volume 1, 1932, John Wiley & Sons, Inc., New York. An alternative method of preparation has been described by Slotta and Jacobi, Zeit. Anal. Chem. 80, 97–103 (1930).

In the preparation of the active compounds employed in my invention, it is not to be inferred that a pure compound is isolated at each step in the process. Purification of intermediates and final products is ordinarily practical only to the extent of removing impurities and/or by-products present that might adversely affect yields of the desired products or that might cause phytotoxic effects on plants.

Although I do not intend that the methods of synthesis of my compounds be limited to the procedures herein described, the following examples are illustrative. Examples 1 and 2 describe the preparation of ammonium salts which may be used as intermediates in the preparation of compounds useful in the practice of the invention.

EXAMPLE 1

*Ammonium salt of N-nitroso-N-phenylhydroxylamine*

A mixture of 123 g. (1.0 mole of nitrobenzene, 162 g. of calcium chloride dihydrate, 180 g. of sodium chloride, 1000 cc. of water, and 442 g. of 38% sodium hydrosulfide solution was stirred for 75 minutes, and was cooled to maintain the temperature below 30° C. At the end of this time, 159 g. of ammonium chloride suspended in 300 cc. of water was added to the mixture, which was then stirred for an additional 5 minutes. The pale yellow residue obtained by filtration weighed 151 g. and was suspended in 1 l. of water. The suspension was cooled and treated with 70 cc. of conc. hydrochloric acid at 0–5° C. To the acidified suspension at 0–5° C. was gradually added 55 g. of sodium nitrite dissolved in 100 cc. of water. The resulting yellow slurry was filtered and the moist cake was extracted by triturating with 350 cc. of benzene. The benzene solution was filtered, separated from the aqueous phase, and dried with sodium sulfate. This solution was then cooled and saturated with dry ammonia. The precipitate of the ammonium salt of N-nitroso-N-phenylhydroxylamine thus obtained was filtered, washed with ether, air-dried, and stored in a stoppered bottle in the presence of ammonium carbonate. 73 g. of the desired product was recovered, corresponding to a conversion of 51% based on nitrobenzene.

EXAMPLE 2

*Ammonium salt of N-nitroso-N-2-chlorophenylhydroxylamine*

A mixture of 104 g. (0.66 mole) of 2-nitrochlorobenzene, 50 cc. of benzene, 40 g. of ammonium chloride, and 1350 cc. of water was placed in a flask equipped with an efficient stirrer. 87 g. (1.33 atoms) of zinc dust was added. The exothermic reaction which ensued raised the temperature to 60–65° C. After 40 minutes of reaction, the slurry was filtered. The filtrate was extracted with 200 cc. of benzene, and the filter cake consisting largely of zinc oxide was washed with an additional 200 cc. portion of benzene. The two extracts were combined, dried with magnesium sulfate, cooled in an ice-salt bath, and finally saturated with dry ammonia. To the ammoniated solution thus obtained was added gradually 34 g. of n-butyl nitrite in 40 cc. of benzene during a 65 minute period. Cooling of this solution and passage of ammonia into it were continued during this addition. The desired product, which precipitated from the solution during the nitrosation, was filtered, washed with ether, and air-dried. The dry product, which weighed 35 g., was stored in a closed container in the presence of ammonium carbonate.

Other derivatives prepared by the above described procedure are: ammonium salt of N-nitroso-N-3-chlorophenylhydroxylamine; ammonium salt of N-nitroso-N-4-chlorophenylhydroxylamine; ammonium salt of N-nitroso-N-4-tolylhydroxylamine; ammonium salt of N-nitroso-N-2-anisylhydroxylamine; ammonium salt of N-nitroso-N-4-bromophenylhydroxylamine.

EXAMPLE 3

*Cupric salt of N-nitroso-N-phenylhydroxylamine*

To an agitated suspension of 465 g. (3.0 moles) of the ammonium salt of N-nitroso-N-phenylhydroxylamine in 2000 cc. of water was gradually added 375 g. (1.5 moles) of copper sulfate pentahydrate dissolved in 1300 cc. of water. The resulting gray-blue slurry was filtered and washed successively with water and methanol to provide the desired cupric salt, which after being dried, weighed 500 g.

EXAMPLE 4

*Ferric salt of N-nitroso-N-phenylhydroxylamine*

One mole of ferric chloride hexahydrate was dissolved in 800 cc. of water. This solution was added slowly to a suspension of 465 g. (3.0 moles) of the ammonium salt of N-nitroso-N-phenylhydroxylamine in 2000 cc. of water. The resulting slurry was stirred for 30 minutes after the addition was completed. The product was filtered off, washed with water, and air-dried. The dry ferric salt thus obtained weighed 451 g.

EXAMPLE 5

*Aluminum salt of N-nitroso-N-phenylhydroxylamine*

To a suspension of 465 g. (3.0 moles) of the ammonium salt of N-nitroso-N-phenylhydroxylamine in 2000 cc. of water was added gradually a solution of 242 g. (1.0 mole) of aluminum chloride hexahydrate in 800 cc. of water. The precipitated aluminum salt, after being filtered, washed with water, and air-dried, weighed 425 g.

EXAMPLE 6

*Cupric salt of N-nitroso-N-3-chlorophenylhydroxylamine*

A solution of 5 g. of copper sulfate pentahydrate dissolved in 20 g. of water was added to a solution of 5.5 g. of the ammonium salt of N-nitroso-N-3-chlorophenylhydroxylamine and 200 cc. of water. The resulting slurry was stirred thoroughly and was filtered. The residue was washed with water and air-dried, leaving 5.5 g. of gray-blue powder, which was the desired cupric salt.

This procedure was used to prepare the following similar salts: cupric salt of N-nitroso-N-4-tolylhydroxylamine; cupric salt of N-nitroso-N-2-anisylhydroxylamine; cupric salt of N-nitroso-N-4-bromophenylhydroxylamine.

EXAMPLE 7

*Zinc salt of N-nitroso-N-phenylhydroxylamine*

35 g. of zinc nitrate hexahydrate was dissolved in 200 cc. of water, and the solution was heated to 70° C. To this was added gradually a solution of 31 g. of the ammonium salt of N-nitroso-N-phenylhydroxylamine in 300 cc. of water with stirring while maintaining a temperature of 65–70° C. The slurry so formed was allowed to cool slowly to room temperature. The resulting precipitate was filtered, washed with water, and dried at 50° C., leaving 32 g. of the desired zinc salt.

EXAMPLE 8

*Sodium salt of N-nitroso-N-phenylhydroxylamine*

77.5 g. of the ammonium salt of N-nitroso-N-phenylhydroxylamine was suspended in 500 cc. of methanol at room temperature, and to the resulting suspension was added gradually a solution comprising 20 g. of sodium hydroxide and 300 cc. of methanol. This mixture was stirred, and the resulting slurry was cooled to 15° C., filtered, washed with methanol, and dried at 50° C. The sodium salt thus obtained was a white crystalline solid weighing 50 g.

The compounds which are included in my invention may be applied to plants or parts thereof in a variety of ways, such as by dusting, spraying, dipping, or tumbling, as best suits the protection problem at hand. They may be used as such in certain cases, particularly if they are processed to suitable physical form. More frequently they are formulated with carriers before application. Carriers may be liquid, for example, water, or solid, for example, any of the solid carriers or mixtures thereof hereinafter more particularly referred to. It is a matter of the type of protection problem whether a water soluble or insoluble form of active ingredient is preferably used.

The active materials may be formulated in powder form for dust application. For this purpose they may be adsorbed on or incorporated with suitable solid carriers, for example, clays such as bentonite, kaolin, and fuller's earth; or talcs such as fibrous, lamellar, crystalline, soapstone, and pyrophyllite; or silicas such as diatomite, pumicite, and tripolite; or lime products, such as hydrated lime and ground limestone; or flours such as wood, walnut shell, wheat, soybean, potato, and cottonseed; or with other materials such as volcanic ash, by-product lignin, and lignocellulose; or any other suitable material employed for this purpose in the art.

In such dust formulations as above any desired particle size may be employed, such as those prevailing in ordinary commercial dusts marketed for agricultural use. I prefer to use compositions which will pass substantially completely through a screen of 325 mesh. Appreciably larger particle size is less conducive to obtaining an economic application of material.

For dusting purposes I prefer a formulation in which the active ingredient is present to the extent of 10–50% by weight of the total. This amount normally gives a free flowing product which dusts easily. However, these concentrations are only indicative of ranges that give desirable qualities to a dusting composition and formulations may be made with higher or lower active ingredient content. Thus compositions containing from say 5% to 95% of active ingredient by weight are contemplated, the remainder being carrier and/or any other additive which might be desired.

It is often advantageous to add small percentages of wetting agents to dust formulations.

From 0.05% to 1.5% by weight of the formulation of fatty alcohol sulfates, such as sodium lauryl sulfate; salts of alkylaryl sulfonates, such as sodium dodecylbenzene sulfonate, sodium dodecyltoluene sulfonate, and sodium nonylnaphthalene sulfonate; alkyl ethers or thioethers and alkylaryl ethers of polyethylene glycol, such as the dodecyl ether or thioether, the p-tert. octylphenyl or p-tert. nonylphenyl ether of a polyethyleneoxide polymer containing from five to twelve ethyleneoxide units; ordinary soaps, such as sodium oleate and sodium stearate; or other wetting agents such as sulfonated castor oil may be used.

Another general method of applying my compounds is by spraying onto growing plants, for instance in the form of a slurry with a liquid carrier, of which water is an excellent example.

A suitable slurry may be prepared, for example, by mixing equivalent amounts of a water-soluble salt of an N-nitroso-N-arylhydroxylamine described herein and of a soluble inorganic cupric salt such as cupric sulfate directly in the tank of a spray apparatus to form the desired insoluble cupric salt. Alternatively, such a slurry may be prepared by suspending a 100% active finely divided water-insoluble salt, such as the copper salt of an N-nitroso-N-arylhydroxylamine in a tank charge of water. For most crop applications one to four pounds of active ingredient per 100 gallons of water is used. In such use a surface active agent which is more predominantly a wetting agent such as any of the group listed above and a surface active agent which is more predominantly a dispersing agent such as described below may be added in amounts equal to say from 0.5–2.0% of the weight of active ingredient. The use of a wetting agent is primarily for the purpose of producing an improved protective film of the active ingredient over plant surfaces, whereas the use of a dispersing agent is primarily for the purpose of obtaining improved suspension of the solid particles in the liquid medium.

In my preferred process for employing the slurry method, I prepare a formulation comprising a dispersing agent and a dust of the type already described above. At the time of spray application an appropriate amount, usually one to four pounds, of this formulation is added to 100 gallons of water. Examples of suitable dispersing agents are materials such as calcium lignin sulfonate, sodium naphthalene-formaldehyde polymer sulfonate, agar agar, or a water-soluble salt of abietic acid. This agent is incorporated in amounts of say 0.5% to 1.5% by weight of the final product during the manufacture of the dust formulation.

In the practice of my invention as applied to seed treatment I have at times tumbled the seed with the dry 100% active ingredient. However, solid carriers of the types previously mentioned may be employed in amounts comprising say from 5% to 50% of the total weight. I generally prefer to use a mixture that contains approximately 10% of such carriers and have found that Homer Clay (sold by United Clay Mines Corp., Trenton, N. J.) is an unusually good carrier for this purpose. From 0.5 to 4 ounces of active material per bushel of seed has proved adequate for this use.

For the dust, slurry, and seed treatment formulations of my invention as described above I prefer to use water-insoluble species of the indicated active ingredients. I have found the copper salts to be especially advantageous. By this choice of active ingredients, deposits possessing maximum weathering and leaching resistance and minimum phytotoxic effects are obtained on the treated plants.

Many growers experience a heavy loss of plants during seedling stage due to the conditions called "damping-off." I have found that not only does my seed treating process as outlined above reduce this loss, but that I can treat the entire amount of seed-bed soil with the active ingredients previously described and greatly reduce or prevent the occurrence of this disease. This process is particularly suitable for many crops in which the seedlings are raised in flats or beds and later transplanted and it is also of utility for the rooting of cuttings. For these uses a water-soluble active ingredient is preferred. Dosages per cubic foot of soil of from 50–500 milligrams of active ingredient dissolved in water sufficient to wet the soil have been found effective for use in seed flats. Seed-bed tests indicate that 10–25 pounds per acre of active ingredient will give good control of "damping-off."

Deterioration of fruits after harvesting and during packing, shipping, merchandising, etc. is often caused by microbiological action. Spraying or dipping of many freshly harvested fruits, preferably with water solutions of soluble types of the herein described active ingredients, effectively retards or prevents this deterioration, particularly of citrus fruits. Solutions containing as little as 50 parts per million active ingredient and 0.025% of a wetting agent may be used. If desired, dusts or slurries of either water-soluble or water-insoluble active ingredients may also be employed.

While I have referred above to certain salts as being water-soluble and to other salts as being water-insoluble, it is to be understood that these terms are employed in their usual relative sense common in the art.

Roughly speaking I classify as water-soluble salts the sodium, potassium, alkylammonium, alkanolammonium, and mixed alkyl-alkanolammonium salts. Also roughly speaking, I classify as water-insoluble salts the copper, calcium, barium, magnesium, aluminum, and iron salts. The mercurous salt is likewise classified as water-insoluble, when care is taken in its formulations not to produce a mixture which is alkaline. The zinc salt is used as a water-insoluble salt in those formulations that are maintained substantially at neutrality. At decidedly acid pH or basic pH, the zinc salts are generally speaking water-soluble.

EXAMPLE 9

*Fruit treatment*

Solutions containing equivalent amounts of the ammonium salt of N-nitroso-N-phenylhydroxylamine and cupric sulfate were mixed and the resulting precipitate of the cupric salt of N-nitroso-N-phenylhydroxylamine was filtered, washed, and dried. A 0.25% by weight (i. e., 2500 parts per million) suspension of this dry, finely divided solid was prepared in an aqueous medium containing 0.1% non-ionic wetting agent. This suspension was then sprayed on ripe tomatoes in such a manner as to completely wet the fruit. A concentrated suspension of the spores of tomato anthracnose (*Colletotrichum phomoides*) was then sprayed on the fruit. The sprayed tomatoes were then incubated for 5 days at 79 to 80° F. in a chamber in which humidity was controlled at very near 100%. The percent protection as compared with controls was noted, and better than 75% disease control was obtained. In view of the stringent conditions employed in the test, such high disease control was outstanding.

The compounds of this invention may also be employed very effectively in the treatment of fruits generally, such as in the control of apple scab (caused by *Venturia inaequalis*), of brown rot of stone fruits such as peaches (caused by *Sclerotinia fructicola*) and of bitter rot of apples (caused by *Glomerella cingulata*).

EXAMPLE 10

*Protection of seeds*

Pea seeds were treated with the compounds as listed below by tumbling the seeds with the finely divided active ingredients. Dosages were measured as grams of active ingredient per 100 g. of seed. The seeds were then planted in flats which were kept moist and held at temperatures favorable for germination. The percent emergence of the seed was then noted. The soil used in these tests was heavily infected with microorganisms which prevent seed emergence. Results are tabulated as follows:

| Dosage g./100 g. | 1.00 | 0.50 | 0.25 | 0.10 | 0.05 |
|---|---|---|---|---|---|
| Treatment: | | | | | |
| Untreated percent emergence | 8.3 | 3.3 | 6.6 | 5.0 | 8.3 |
| Cupric salt of A_____do____ | 96.6 | 93.3 | 86.6 | 83.3 | 76.6 |
| Ferric salt of A_____do____ | 43.3 | 31.3 | 31.6 | 40.0 | 38.5 |
| Aluminum salt of A___do____ | 80.0 | 73.3 | 56.6 | 41.3 | 21.6 |

A = N-nitroso-N-phenylhydroxylamine.

The unusual efficacy of these compounds, notably at low dosage levels, is thus strikingly demonstrated.

In the treatment of tomato plants for the prevention of blight, either early or late, the materials are applied to the growing plants such as by dusting or by spraying. Thus the growing plants may be sprayed with the active ingredient in water, preferably a suspension in water of a water-insoluble salt, and more preferably by a formulation of a water-insoluble salt such as has been described above, until the plant is adequately wetted with the spray. In view of the substantially complete absence of phytotoxic effects when water-insoluble salts are employed, any desired dosage of these materials may be applied although economy will dictate the use of no more than is necessary to obtain the desired effect. This dosage will normally be from 1 to 5 pounds of active ingredient per acre, depending upon the rankness of foliage and the existing disease potential.

Although my water-soluble salts may be employed for this purpose, the use of water-insoluble materials for the spraying of plants is so conventional in avoiding washing off of the active ingredient by rain, that the use of a water-soluble salt for plant spray purposes is not recommended.

The efficacy of the compounds of this invention in the treatment of plants is cogently demonstrated by the action of the salts of N-nitroso-N-arylhydroxylamines on spores of fungi which cause some of the major and difficultly controllable plant diseases, for example, apple scab, tomato anthracnose, tomato and potato blights, brown rot of stone fruits, bitter rot of apples, etc.

Illustrative of this phenomena is the substantially complete inhibition of spore germination after an incubation period of as much as 72 hours using suspensions of from 1 to 100 parts per million of the active ingredients, such as the aluminum, zinc, sodium, ferric, and cupric salts of N-nitroso-N-phenylhydroxylamine; and salts of N-nitroso-N-2-chlorophenylhydroxylamine, N-nitroso-N-3-chlorophenylhydroxylamine, N-nitroso-N-4-chlorophenylhydroxylamine, N-nitroso-N-2-anisylhydroxylamine and N-nitroso-N-4-tolylhydroxylamine. Likewise, any of the other salts to which this invention pertains may be used for the same purposes.

Having more particularly described my invention, it is to be understood that this is by way of illustration and that changes, omissions, additions, substitutions, and/or modifications may be made within the scope of the claims without departing from the spirit of the invention. For example, other substances than the carriers and/or surface active agents referred to above may be included in the solid, semi-solid, or liquid formulations, if desired, to accomplish various desired results such as the prevention of lumping during storage, or improvement in respect to coverage, moisture adsorption, adherence, etc. The purposes of many such additions and the materials to be added are well known in the art and do not require elaboration. Then too when soil treatment is contemplated, such treatment may be prior to, during, or after planting, such as of seed, or transplanting, such as of growing plants, or otherwise. Also, any other alkali metal cation may be substituted at M in the above formula for sodium or potassium, or any other alkaline earth cation may be substituted at M for calcium or barium. Accordingly, it is intended that the patent shall cover by suitable expression in the claims the features of patentable novelty which reside in the invention.

I claim:

1. A method for protecting a plant against the growth of plant attacking bacteria and fungi, comprising applying to the environment of said plant a compound having a structural formula as follows:

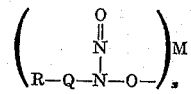

wherein M is a cation selected from a group consisting of sodium, potassium, calcium, barium, magnesium, zinc, copper, aluminum, iron, mercury, alkylammonium having from 1 to 3 carbon atoms in each alkyl group, alkanolammonium having from 2 to 3 carbon atoms in each alkanol group, and mixed alkylalkanolammonium having from 1 to 3 carbon atoms in each alkyl group and from 2 to 3 carbon atoms in each alkanol group; wherein $x$ is a number corresponding to the valence of M; wherein Q is the phenyl radical; and wherein R represents from 0 to 1 substituents on the aromatic ring selected from the group consisting of halogen, alkyl, alkoxy, aryloxy, and aryl.

2. The method of claim 1 wherein the plant is a plant while growing.

3. The method of claim 1 wherein the plant is a fruit.

4. The method of claim 3 in which the fruit is a growing fruit.

5. The method of claim 3 in which the fruit is a harvested fruit.

6. The method of claim 1 wherein the plant is a seed.

7. The method of claim 1 wherein the treating compound is applied directly to the plant.

8. The method of claim 1 wherein the treating compound is applied to the soil.

9. The method of claim 1 in which the compound is the cupric salt of N-nitroso-N-phenylhydroxylamine.

10. The composition of claim 12 in which the carrier is present in an amount between 5% and 95% of the total composition.

11. The composition of claim 15 in which the carrier is present in an amount between 5% and 95% of the total composition.

12. A plant protectant composition comprising a compound having the formula:

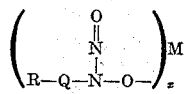

wherein M is a cation selected from a group consisting of sodium potassium, calcium, barium, magnesium, zinc, copper, aluminum, iron, mercury, alkylammonium having from 1 to 3 carbon atoms in each alkyl group, alkanolammonium having from 2 to 3 carbon atoms in each alkanol group, and mixed alkylalkanolammonium having from 1 to 3 carbon atoms in each alkyl group and from 2 to 3 carbon atoms in each alkanol group; wherein $x$ is a number corresponding to the valence of M; wherein Q is the phenyl radical; and wherein R represents from 0 to 1 substituents on the aromatic ring selected from the group consisting of halogen, alkyl, alkoxy, aryloxy, and aryl; a carrier, and a surface-active adjuvant selected from the group consisting of dispersing agents and wetting agents.

13. The composition of claim 12 wherein the adjuvant comprises a wetting agent.

14. The composition of claim 13 wherein the adjuvant comprises a dispersing agent.

15. A plant protectant composition comprising the cupric salt of N-nitroso-N-phenylhydroxylamine, a carrier and a surface active adjuvant selected from the group consisting of dispersing agents and wetting agents.

JOHN T. MASSENGALE.

References Cited in the file of this patent

Bamberger et al. Ber., volume 42, pages 3568–82, Thru Chem. Abstract volume 4, page 183 (1910).

Bamberger et al. Ann. 375, pages 316 to 333 Thru Chemical Abstract volume 4, page 3200 (1910).

Colman—U. S. D. A. Bur. Ent. and Plant Quar., Insect. Invest. Mimeo Pub. E—592 (1943).